United States Patent Office 3,023,039
Patented Feb. 27, 1962

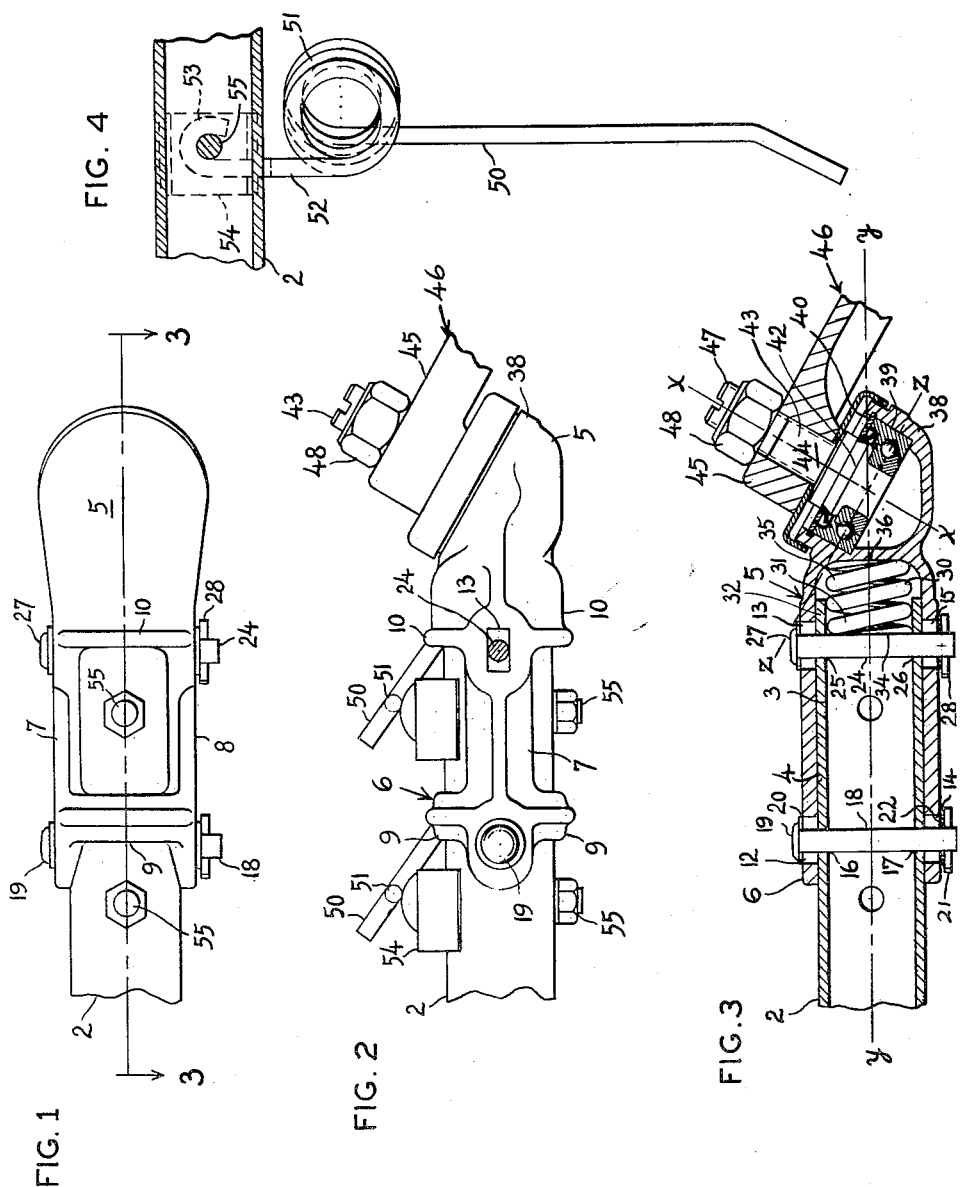

3,023,039
TOOTH BAR MOUNTING FOR PARALLEL RAKES
Etlar A. Henningsen, Riverside, and Edward J. Johnston, Cicero, Ill., assignors to International Harvester Company, Chicago, Ill., a corporation of New Jersey
Filed Feb. 27, 1957, Ser. No. 642,804
2 Claims. (Cl. 287—119)

This invention relates to mounting of tooth bars in a parallel bar rake and more specifically to a means for controlling the positioning of the tooth bars in relation to the spiders upon which the bars are mounted.

The general object of the invention is to provide a novel mounting for tooth bars wherein the positions of the bars are yieldably maintained to compensate for discrepancies and manufacturing tolerances, which interfere with alignment of the parts.

Parallel bar side rakes are usually provided with a plurality of rake bars, normally three, four or five, which at opposite ends are connected to spiders which serve to mount the bars. In machines currently being used in this country the reel which is composed of the tooth-carrying bars and the spiders, is mounted within a basket which is provided with stripper bars for stripping the teeth as they perform their raking operation. It is therefore mandatory to control the position of the tooth bars and thus the path of movement of the teeth carried thereby so that they have proper stripping cooperation with the stripper bars without straddling the same or shifting and thus bending, breaking, etc. At the same time the connection between the tooth bar and the spiders must be such as to accommodate manufacturing discrepancies and therefore the connection must have yield in controlled directions.

A more specific object of the invention is to provide a novel tooth bar connection to a spider comprising two telescoping parts with a compression spring interposed therebetween tending to elongate the parts and wherein one of the parts is connected to the spider and the other part is the tooth bar.

A further object of the invention is to provide such a yieldable connection and mounting wherein the compression spring has a pre-set length which in its fully extended condition will maintain the parts of preset length and where the connection may elongate without stressing the spring and contract against the compression of the spring.

These and other objects of the invention will become more apparent from the specification and the drawings wherein:

FIGURE 1 is a side elevational view of the connection with the tooth bar only fragmentarily shown;

FIGURE 2 is a plan view of the bar, connector and the spider fragmentarily shown;

FIGURE 3 is a longitudinal sectional view taken substantially on the line 3—3 of FIGURE 1; and FIGURE 4 is a longitudinal sectional view of a fragmentary portion of the bar with a spring tooth mounted thereon.

Describing the invention in detail and having particular reference to the drawings, there is shown fragmentarily one tooth bar 2 for a side delivery rake which is commonly known as the parallel bar type such as discussed and illustrated in U.S. Patent 2,708,822. The rake bar 2 herein shown is illustrated as being a tube or pipe but it will be understood that it may be of any other form such as a channel or the like. The bar 2 has an end portion 3 which telescopes within a socket 4 of a mounting holder or connecting element generally indicated 5 which comprises a preferably cylindrical skeletal socket portion 6 which includes diametrically spaced ribs 7 and 8 which are elongated axially of the tooth bar 2 and are interconnected by axially spaced inner and outer ring portions 9 and 10. The ribs 7 and 8 are provided with axially elongated slots 12, 13, 14 and 15 and the slots 12, 14 are aligned with openings 16 and 17 in the pipe 2 which receive a pin 18 snugly therein, said pin projecting at opposite ends into the slots 12, 14 and being headed at 19 and through a washer 20 engaging the outer side of the portion 7 and at its other end being provided with a key 21 which abuts through a washer 22 against the outer side of the rib 8. Similarly the openings 13, 15 receive opposite ends of a pin 24 which is snugly fitted within openings 25, 26 in the pipe 2, the pin 24 being headed at 27 and being provided with a key such as a cotter 28 at its opposite ends whereby it is retained with a washer in assembly with the socket portion. It will be observed that inasmuch as the slots 12 through 15 are elongated longitudinally of the shaft or bar 2 that the connecting member 5 is accommodated movement lengthwise along axis $y, y$. This movement is yieldably resisted in a telescoping direction of the member 5 with the bar 2 by means of a compression spring 30 which at its inner end 31 fits within the adjacent open end 32 of the shaft 2 and the inner end portion 31 is seated against the abutment surface or seat as at 34 on the stud or pin 24 which in effect is part of the bar. The outer end portion 35 of the spring 30 seats against an abutment or seat 36 which forms the closed end of the socket. Outwardly of the socket portion of the connecting member 5 there is provided a bearing holding socket portion 38 wherein there is retained a bearing 39 by means of a retainer ring 40, the bearing being fitted about the adjacent end 42 of the stub shaft 43 which has a shank portion 44 extending through an arm 45 of a spider generally fragmentarily shown at 46, the distal end 47 of the stub shaft being provided with a nut 48 which with the enlarged inner end portion 42 of the stud embraces the arm 45 therebetween and is snugged up and connected thereto. It will be observed that the axis $x—x$ of the stub shaft 42 intersects the axis $y—y$ of the bar 2 which is intersected by the plane $z—z$ of the bearing 39. Thus the bearing unit has its plane of rotation substantially normal to the shaft axis and passes through the point of intersection of the shaft axis and the axis of the bar. It will be observed, however, that the rake fingers 50 are located in a plane which is spaced forwardly with respect to the central longitudinal plane of the rake bar and that each of the teeth is provided with a coil torsional spring intermediate its ends as at 51 and that the end coil extends into an upwardly extending shank portion 52 which is provided at its upper end in a hook 53 which is secured through the medium of a clamp 54 to the bar by means of a suitable bolt and nut assembly 55.

It will be observed that the spring 30 has a predetermined static length and this length is such as will center the pins 18 and 24 with respect to the slots 12, 14 and 13, 15 respectively. It will be appreciated that the bar and the entire bar assembly spans the distance between the two spiders and that by providing the spring means, the load or driving forces are transferred through the spring into the tooth bar and the bar is therefore held in predetermined position so that the fingers or the rake teeth may be properly aligned with respect to the stripping bars as heretofore discussed as explained in the aforementioned patent. It will be also understood that if there is any discrepancy insofar as the spacing or the position of the axis of rotation of the spiders or shafts 43 there is still provided means to obtain the necessary elongation of the bars so as to prevent binding. However, this is yieldably controlled in the driving direction and therefore any looseness or uncontrolled longitudinal shifting of the bar is precluded.

What is claimed is:
1. For a side delivery rake, a rake bar having an end portion, a connecting element disposed in telescoped relation with said end portion for relative longitudinal movement, said bar and said element having opposed abutments, and rake bar positioning means comprising resilient means including a coil spring coaxially disposed with respect to said bar and interposed between said element and said bar for yieldably resisting said longitudinal movement thereof only in the contracting direction of the spring and said spring having a static length less than the maximum distance that said abutments are movable apart upon longitudinal extension of the bar and element.

2. The invention according to claim 1 and said connecting element and said bar abutments extending transversely of the bar and disposed at opposite ends of the spring, and means between said element and bar limiting movement therebetween longitudinally of the bar.

References Cited in the file of this patent
UNITED STATES PATENTS

| | | |
|---|---|---|
| 819,909 | Muller | May 8, 1906 |
| 978,091 | Wessel | Dec. 6, 1910 |
| 1,234,986 | Weileder | July 31, 1917 |
| 2,327,951 | Zaleske | Aug. 24, 1943 |
| 2,645,502 | Collins | July 14, 1953 |
| 2,683,576 | Miller | July 13, 1954 |
| 2,729,931 | Hamilton | Jan. 10, 1956 |
| 2,761,271 | Spicacci | Sept. 4, 1956 |
| 2,763,120 | Johnson | Sept. 18, 1956 |
| 2,795,101 | Arend | June 11, 1957 |